Dec. 18, 1962

M. H. GROVE 3,068,895

COMPLETION VALVE

Filed May 8, 1959

INVENTOR.
Marvin H. Grove

BY

ATTORNEYS

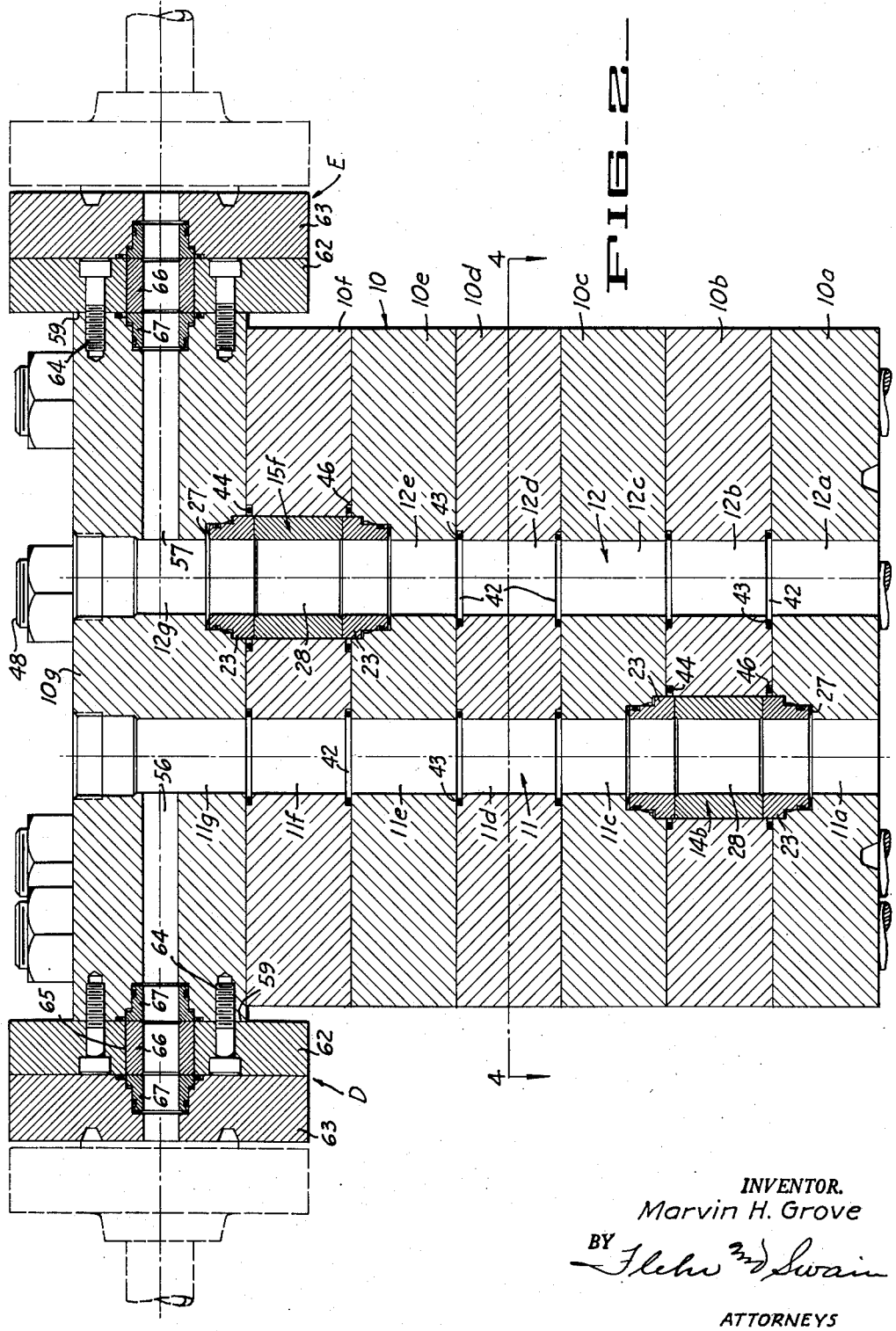

Dec. 18, 1962 M. H. GROVE 3,068,895
COMPLETION VALVE
Filed May 8, 1959 7 Sheets-Sheet 3
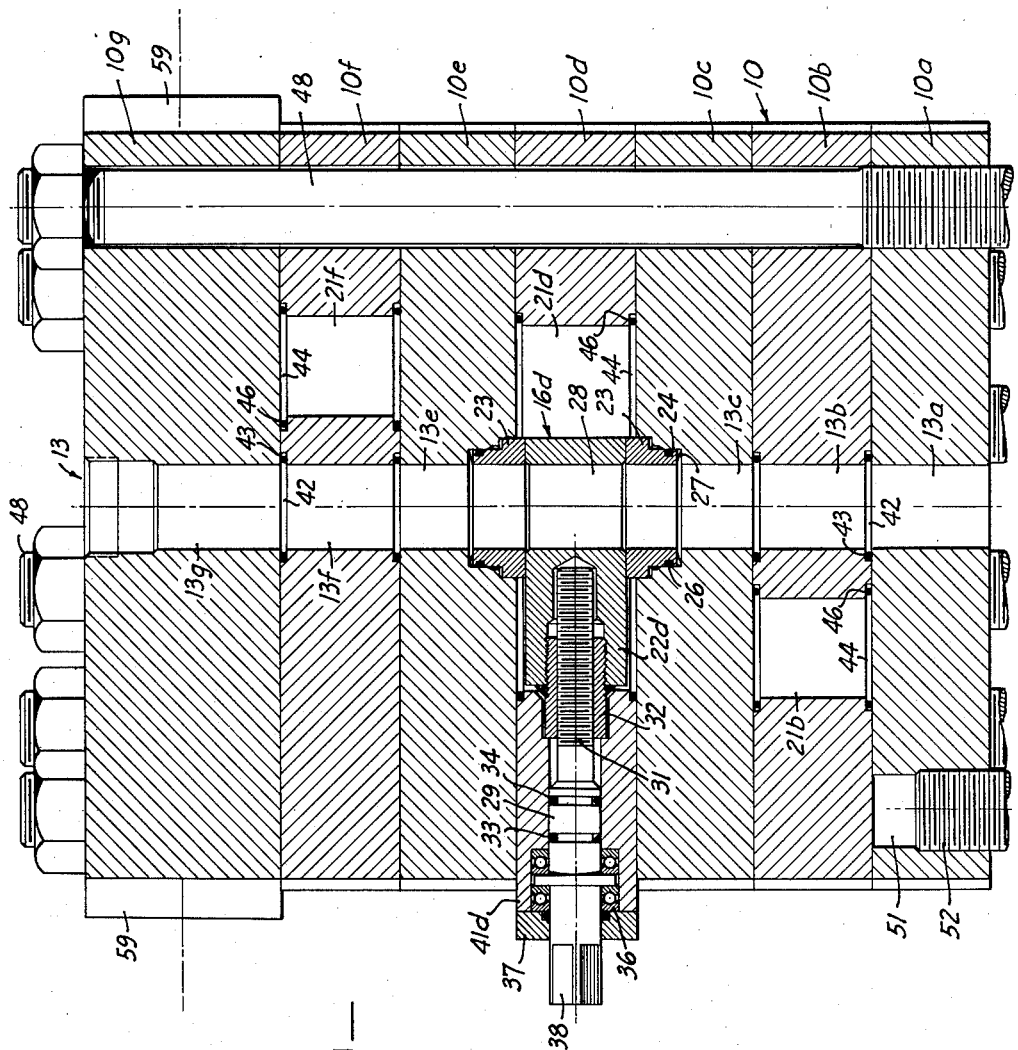
FIG_3
INVENTOR.
Marvin H. Grove
BY
ATTORNEYS Dec. 18, 1962   M. H. GROVE   3,068,895
COMPLETION VALVE
Filed May 8, 1959   7 Sheets-Sheet 4
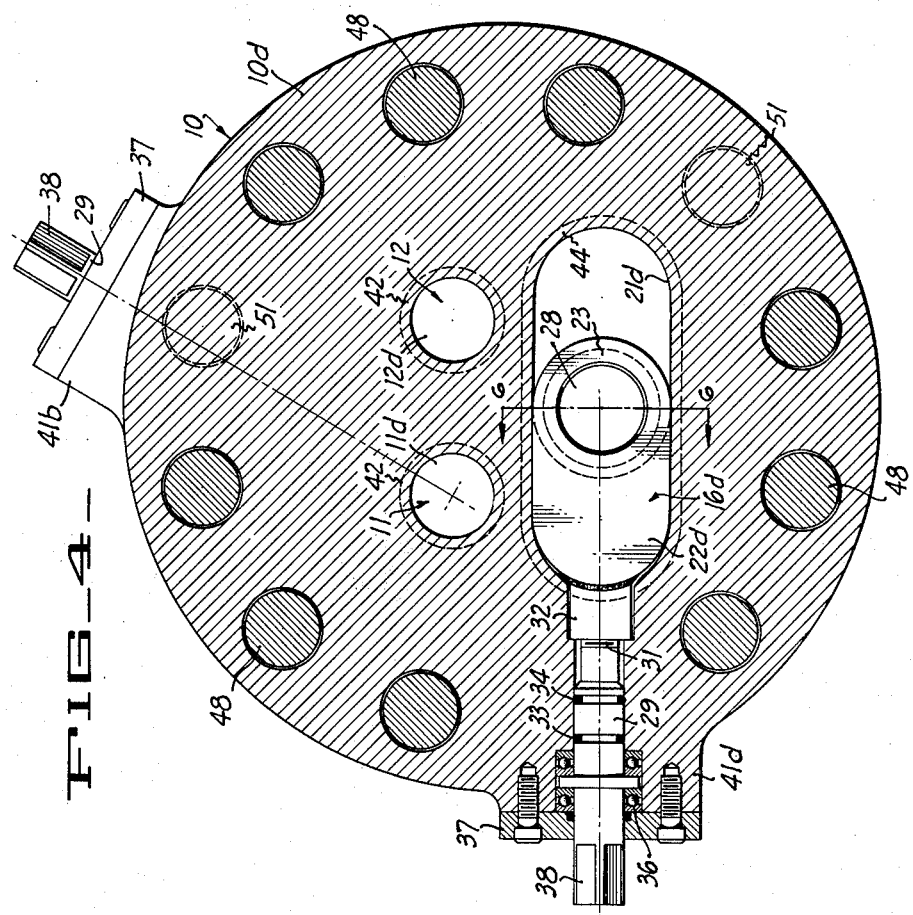
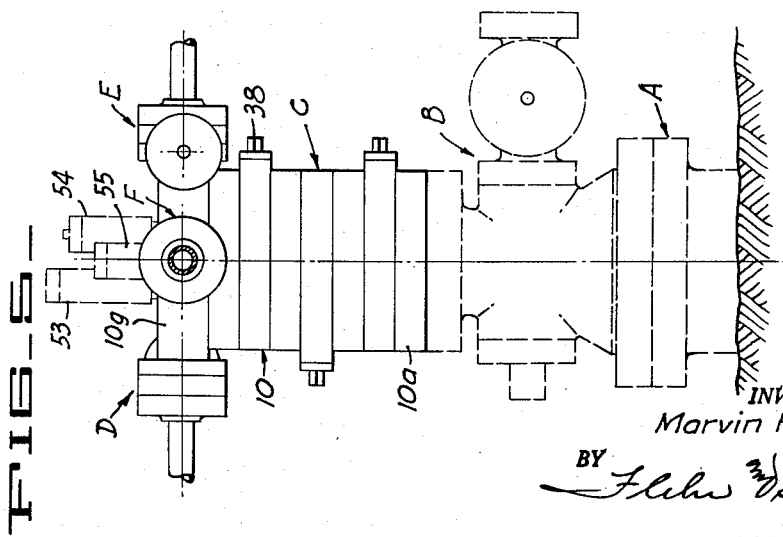
INVENTOR.
Marvin H. Grove
BY
ATTORNEYS Dec. 18, 1962 M. H. GROVE 3,068,895
COMPLETION VALVE
Filed May 8, 1959 7 Sheets-Sheet 5
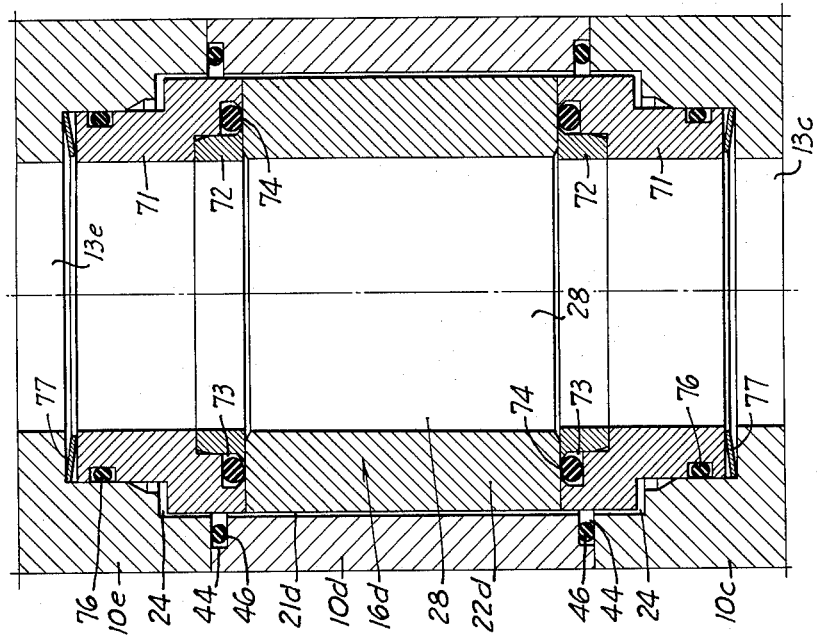
FIG_7
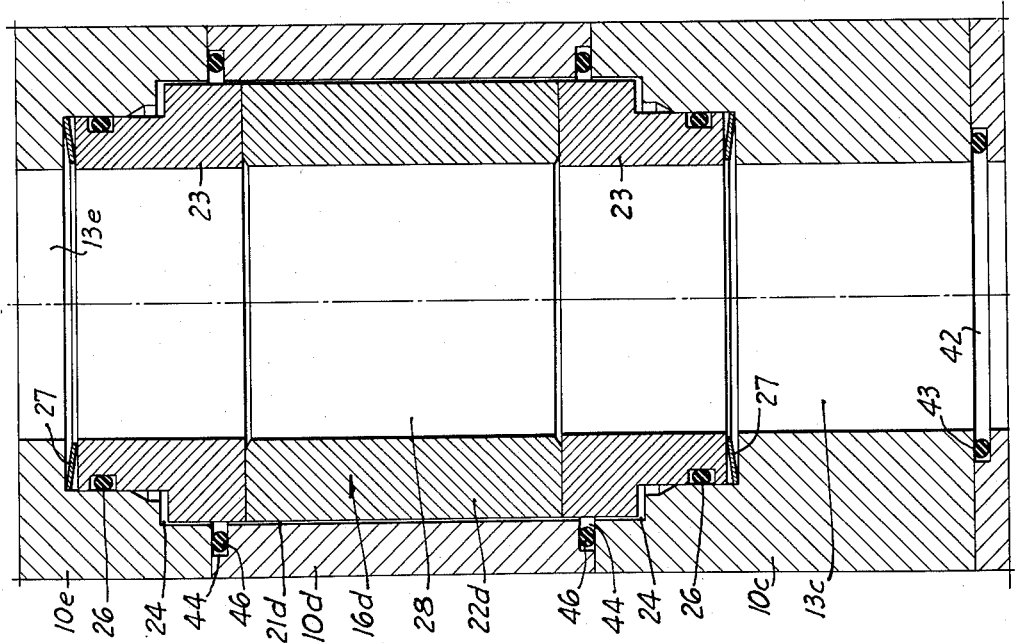
FIG_6
INVENTOR.
Marvin H. Grove
BY
ATTORNEYS Dec. 18, 1962
M. H. GROVE
3,068,895
COMPLETION VALVE
Filed May 8, 1959
7 Sheets-Sheet 6
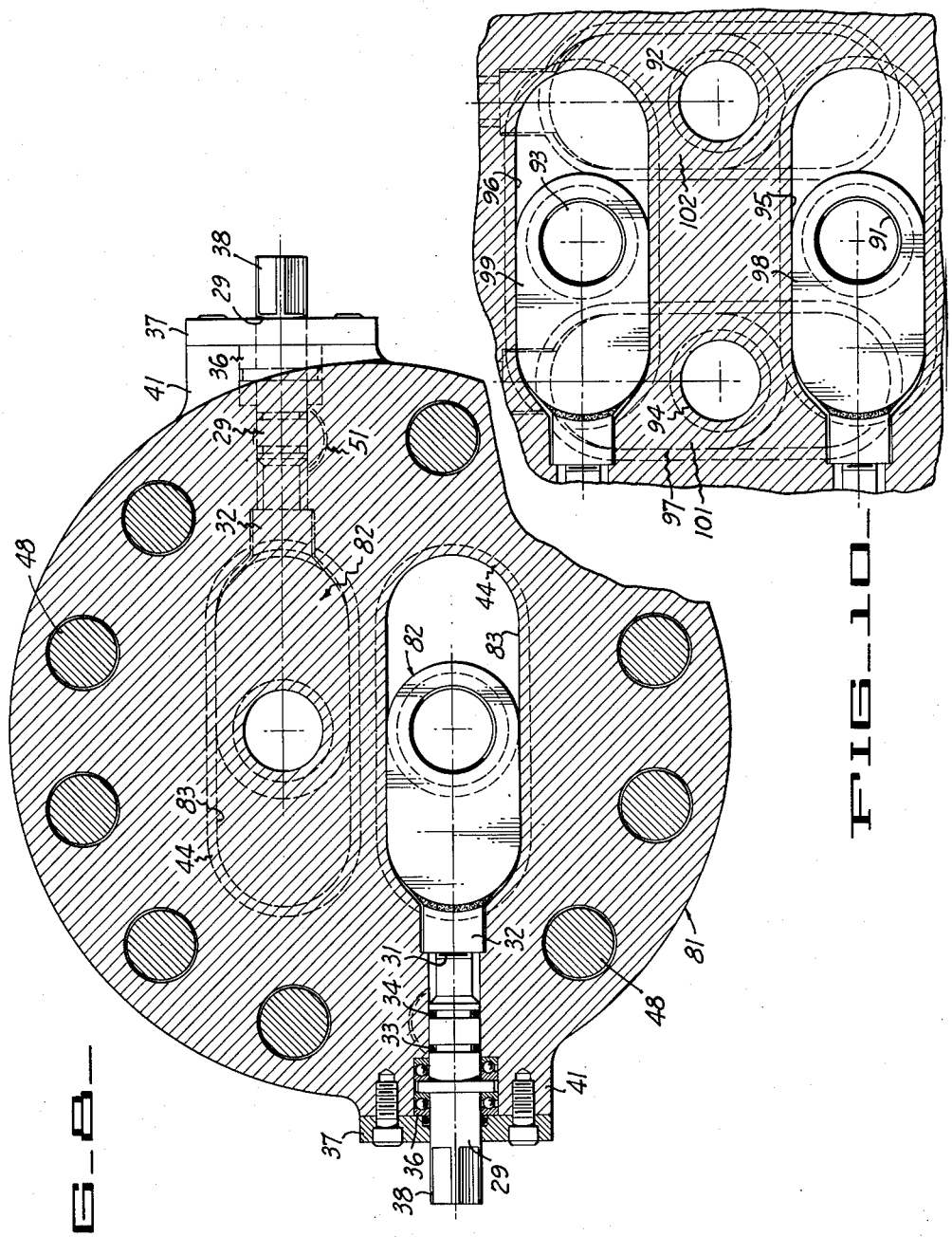
INVENTOR.
Marvin H. Grove
BY
*Fleher and Swain*
ATTORNEYS

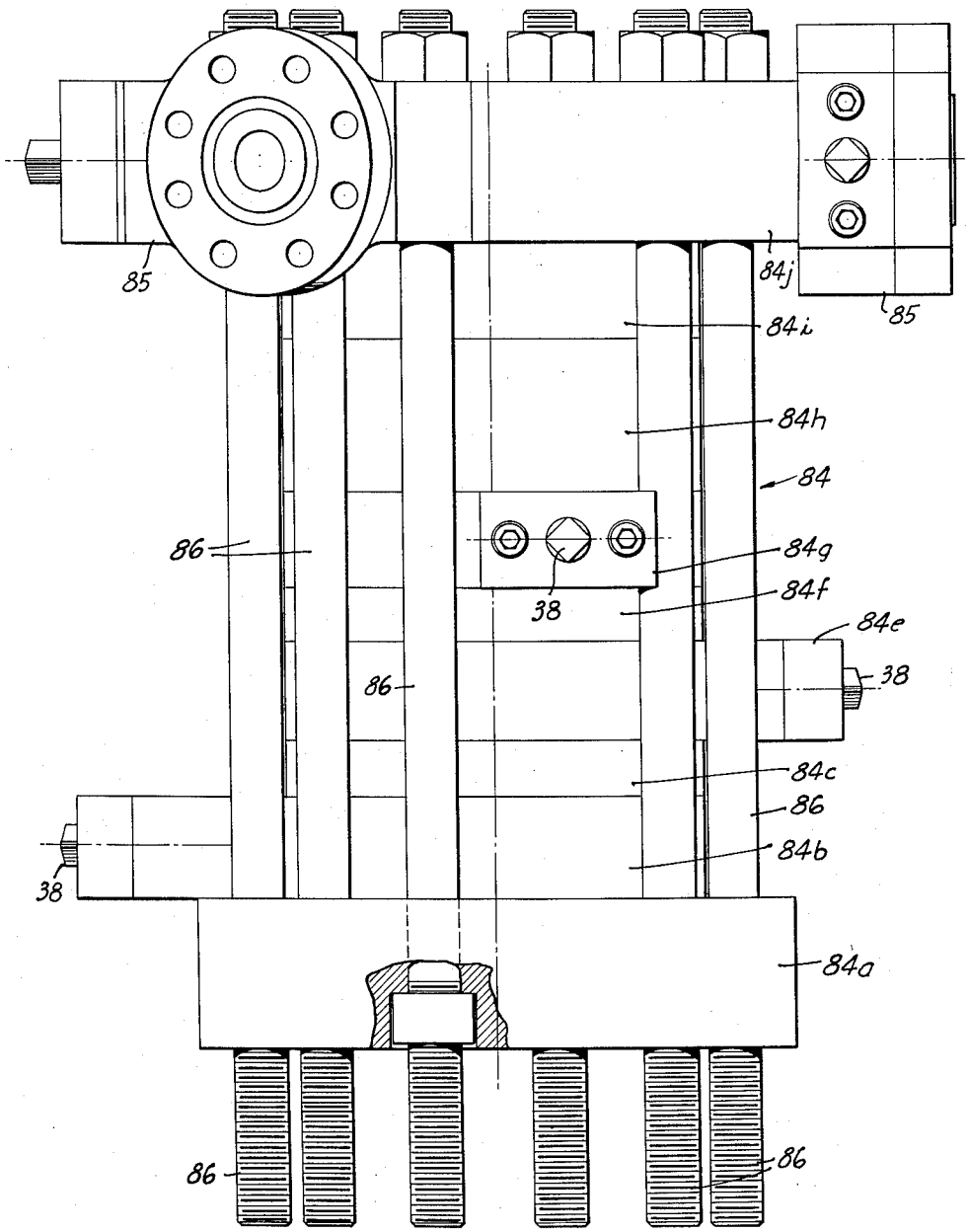
FIG_9

United States Patent Office 3,068,895
Patented Dec. 18, 1962

3,068,895
COMPLETION VALVE
Marvin H. Grove, 340 Hillside Ave., Piedmont, Calif.
Filed May 8, 1959, Ser. No. 812,048
1 Claim. (Cl. 137—594)

This invention relates generally to "completion" valves such as are used in the petroleum industry on oil and gas producing wells.

It is general practice in the petroleum industry to make individual provision for taking oil or gas from separate producing zones. For example if a well has two producing zones, they are isolated by packers and connected to separate tubing strings leading to the top of the well, where the tubes are supported by hangers. A "completion" or "main" valve is mounted on the well head and forms a part of the so-called "christmas tree" assembly. The completion valve has separate flow passages connected with the tubing, together with valve means for controlling each passage independently. The fluid pressures may be relatively high, as for example from 5,000 to 10,000 p.s.i. or higher. In the past such completion valves have been made of steel castings or forgings, provided with separate parallel passages, and valve means of the plug or gate type for each passage. They are relatively expensive to construct due largely to the design of the integral body to provide the closely disposed parallel passages and to accommodate the valve parts. Valves having such an integral body construction are not readily adjustable to different wells and flow conditions.

In general it is an object of the present invention to provide an improved well completion valve which avoids the use of an integral valve body made of a steel casting or forging.

Another object of the invention is to provide an improved well completion valve which is in the form of a plurality of assembled sections, stacked one upon the other.

Another object of the invention is to provide an improved completion valve which is relatively flexible with respect to its adaptability to various wells and producing conditions.

Another object of the invention is to provide a completion valve which can be readily serviced in the field, and which permits removal of one or more sections without disturbing the others.

Additional objects and features of the invention will appear from the following description in which the preferred embodiments have been set forth in detail in conjunction with the accompanying drawing.

Referring to the drawing:

FIGURE 2 is a cross-sectional detail taken along the line 2—2 of FIGURE 1.

FIGURE 3 is a cross-sectional detail taken along the line 3—3 of FIGURE 1.

FIGURE 4 is a cross-section taken along the line 4—4 of FIGURE 2.

FIGURE 5 is a side-elevation illustrating my completion valve installed on a well, and forming a part of the well Christmas tree.

FIGURE 6 is a cross-sectional detail showing one of the valve units and taken along the line 6—6 of FIGURE 4.

FIGURE 7 is a cross-sectional view like FIGURE 6, but showing another embodiment.

FIGURE 8 is a view like FIGURE 4, but showing another embodiment in which the valve body has only two passages instead of three.

FIGURE 9 is a side elevation showing another embodiment.

FIGURE 10 is a plane view illustrating one plate-like section of a valve assembly having four parallel flow passages.

Figure 1:
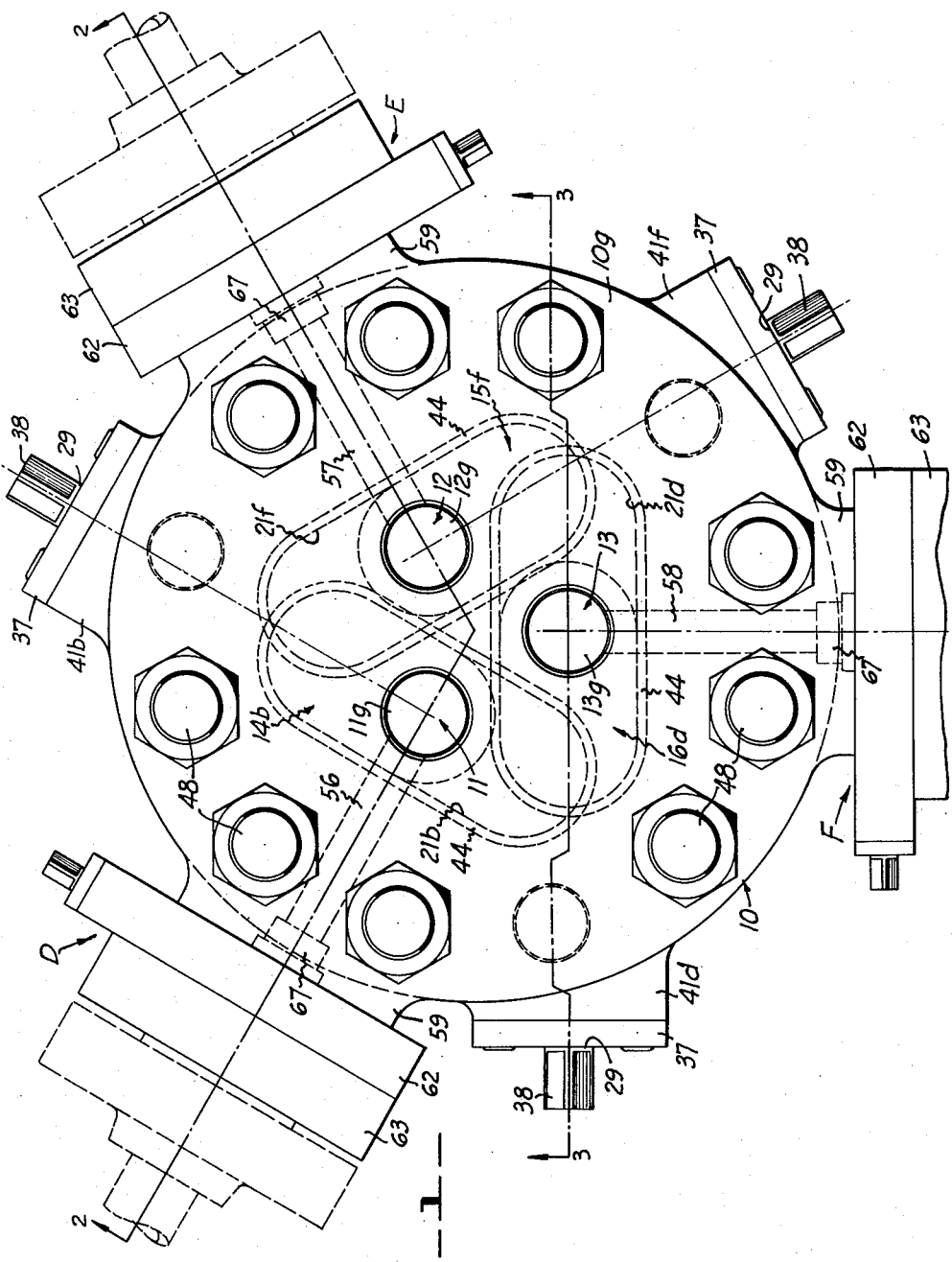
FIGURE 1 is a plan view illustrating a completion valve in accordance with the present invention, with wing valves applied to its upper section.

The present completion valve employs a body formed of a plurality of plate-like sections stacked one upon the other. Each of these sections is provided with openings that are aligned in the stack, thereby forming passages for making connection with producing tubing. Certain ones of the sections are provided with valve means whereby flow through the passages can be controlled. The lowermost section of the stack is adapted for mounting upon a well head, and preferably the uppermost section is adapted for connection with other flow receiving and controlling means, such as additional piping and valves.

In FIGURES 1 to 7 inclusive of the drawing I have shown a completion valve which provides three passages, each controlled by separate valve means, and adapted to make connection with a well equipped with three well tubes. In general this valve consists of a body 10, formed of a plurality of sections 10a–10g inclusive. Each section is in the form of a flat steel plate, formed of suitable material such as cold-rolled steel, and with matching outer configurations. As viewed in plan all of the sections can be generally circular, except that certain sections may have projecting extensions as will be presently described. The assembled sections form the parallel flow passages 11, 12 and 13. Each section is provided with openings, whereby when the sections are stacked, the openings are aligned to form the passages 11–13. These openings are designated 11a–11g for passage 11, 12a–12g for passage 12, and 13a–13g for passage 13.

Certain ones of the valve body sections are provided with valve means of the gate type. Thus section 10b is provided with valve means 14b, which controls flow to the passage 11. A body section 10d is provided with valve means 16d, which controls flow through the passage 13. Body section 10f is provided with valve means 15f, for controlling flow through passage 12. By operating the separate valve means the flow through each of the passages can be controlled.

The construction of each of the valve means 14b, 15f, 16d, can be identical. Taking the valve means 16d, shown particularly in FIGURES 1 and 3, the plate constituting the body section 10d is provided with a cut out space 21d, which is elongated in the manner illustrated in FIGURE 1. Within the space 21d there is a valve member 22d in the form of a gate, which is adapted to move between open and closed positions with respect to the passage 13. The gate has flat parallel sides forming valve working surfaces for cooperating with the seat rings 23. These seat rings are slidably fitted within counterbores 24 provided in the body sections 10c and 10e, and they are sealed with respect to the adjacent body parts by sealing means 26 of the resilient O-ring type. Suitable means such as spring Belleville washers 27, serve to urge the seat rings toward the gate. The gate has a circular port 28 which registers with the passage 13, for full open position.

The suitable operating means illustrated for moving the gate, consists of a stem 29 which extends through one side of the body section 10d, which has its inner threaded end 31 engaging the threaded bushing 32, mounted upon the gate. Sealing means, such as the resilient seal rings 33 and 34 of the resilient O-ring type, prevent leakage between the body and the stem. The body also carries a journal 36 for the stem, and a cover or bonnet plate 37. The outer end portion 38 of the stem is squared or otherwise formed for engaging a hand wheel or other turning means.

The other two valve means can be constructed in the same manner as described above. In particular it will be noted from FIGURE 1 that the elongated spaces 21b, 21d and 21f are each offset from the central axis of the assembly. Also each space extends generally tangential to a circle having the central axis of the assembly as its center, and drawn through the central axis of the passages 11, 12 and 13. The extensions 41b, 41d, and 41f, as shown particularly in FIGURE 1, are formed on the corresponding body sections, and provide convenient mounting pads for the cover plates 37.

Means are provided to prevent leakage between the body sections, whereby each of the passages is effectively sealed with respect to the others and with respect to the atmosphere. Thus alternate body sections are shown provided with recesses 42, which accommodate seal rings 43 of the resilient type, such as O-rings formed of resilient natural or synthetic rubber. Also each of the body sections that is provided with a valve means, is provided with side recesses 44, which follow the general contour or configuration of the gate accommodating space, and which is provided with a resilient seal ring 46, such as a ring of the O-ring type.

All of the body sections are provided with circumferentially spaced openings for accommodating the clamping bolts 48. These bolts serve to take the forces of fluid pressure tending to urge the sections apart.

FIGURE 5 illustrates how my complete valve assembly can be installed on a well. The means "A" represents a well head, device "B" a tubing head carrying tubing hangers, and "C" represents my valve assembly, with its lower plate 10a directly attached to the tubing head flange. The clamping bolts 48 may extend through the flange provided at the upper end of device B, and also the lowermost body section can be provided with threaded holes 51 for accommodating attaching studs 52. Suitable means is provided at the upper ends of the well tubes for forming sealed couplings with the lower ends of the passages 11, 12 and 13. It should be understood that the methods of mounting the complete valve assembly may vary in different instances, and for example one or more devices may be interposed between the tubing head B, and the lower body section of my valve assembly.

At the top of my valve assembly the passages 11, 12 and 13 may connect with associated devices, or may be closed by the plugs 53, 54 and 55, as indicated in FIGURE 5.

The top body section 10g preferably mounts wing valves to distribute flow from the passages 11, 12 and 13 to associated piping. Thus the top body section may take the place of a conventional T, as commonly used in connection with conventional Christmas tree assemblies. Thus as shown in FIGURE 2, the vertical passages 11 and 12 are shown communicating with laterally extending passages 56 and 67, in the top section 10g. A similar passage 58 is provided for the vertical passage 13 (FIGURE 1). The top section 10g is shown provided with pad-like side extensions 59, through which the passages 56, 57 and 58 extend. As illustrated, these pads are used to mount the supplemental wing valves D, E, and F, which serve to control flow from the several vertical passages, to associated piping. Each of these wing valves can be constructed substantially the same as the valves for the body sections. Thus, as shown particularly in FIGURE 2, each wing valve can consist of plate-like body sections 62 and 63, section 62 being attached to the adjacent pad 59, by screws 64. The body section 62 is cut out to form the space 65 for accommodating the flat valve gate 66. The gate cooperates with seat rings 67 which can be substantially the same as described for the main control valves. Bolts or screws (not shown) can be provided for clamping the body sections 62 and 63 together, and for clamping body section 63 to the coupling flanges of associated piping.

It will be evident that the valve assembly described above possesses certain advantages over conventional completion valves. The various body sections can be made from standard mill run steel plate by conventional torch-cutting techniques, followed by simple grinding or machining of the torch-cut surfaces to provide a proper finish. The various body sections, together with their associated flow control valves, can be preassembled and then applied to a well head, or can be assembled directly on the well. As with conventional completion valves, the aligned passages permit access to the tubing, as may be desired from time to time, for various operations, such as the placing of pressure retaining valves, taking of test readings, and the like. Assuming that the top section of the assembly serves to mount wing valves and associated devices, it takes the place of the conventional T of a Christmas tree assembly.

As shown particularly in FIGURE 7, each of the main flow control valves, and also the wing valves, can be provided with sealing means of the O-ring type, similar to that disclosed in Patent No. 2,810,543. Thus in this instance the seat rings 71 are similar to the seat rings 23, but are recessed to accommodate the inner seat ring 72. The circular recess 73, formed on the face of each ring 71, serves to accommodate the resilient seal ring 74 of the O-ring type. As in the previously described valve construction, each ring 71 is sealed with respect to the adjacent body section, by the resilient O-ring 76, and is urged toward the gate by suitable means such as the spring washer 77 of the Belleville type.

Depending upon the well requirements and the number of passages through the assembly, the number of valve units employed may vary. In some instances two valves may be employed for each passage, in which event two assemblies constructed like the assembly previously described are mounted one on top of the other. In some instances four passages are required, and in other instances one or two passages may be sufficient. Assuming, for example, the use of two passages, the disposition of the valves can be as shown in FIGURE 8. In this instance the valve assembly designated at 81 has two of its body sections provided with flow control valves 82. The elongated spaces 83, which serve to accommodate the valve gates, are arranged parallel, but disposed on opposite sides of the central axis of the assembly. When an assembly has a single passage, it will be evident that the control valve may be disposed at the center of one of the body sections.

As shown in FIGURE 9, the assembly may have the clamping bolts engaging only certain of the body sections. Thus in this instance the body is formed of the plate-like sections 84a–84j. Section 84a forms a base that may be mounted on a lower assembly or device, such as another valve assembly unit, or a well head. The top section 84j forms a mounting for the wing valves 85. Both the sections 84a and 84j are formed on a diameter greater than the intermediate sections 84b–84i where the clamping bolts 86 are exterior of the intermediate sections. Assuming that this embodiment has three passages, then sections 84c, 84e and 84g may carry flow control valves.

Previous reference has been made to assemblies incorporating my invention having four parallel flow passages. With such a construction, two valve means can be incorporated in a single plate-like section. Thus, as shown in FIGURE 10, the assembly has four parallel passages 91, 92, 93 and 94, which are spaced equal radial distances from the central axis, and which are equally spaced between their centers. Generally parallel elongated spaces 95 and 96 are provided in the same plate-like section 97, and are associated with passages 91 and 93. The valve gates 98 and 99 are disposed within these spaces, and are constructed and operated in the same manner as the valve gates previously described. As indicated in dotted lines, elongated spaces 101 and 102 are formed in an underlying plate-like section which is separated from the section 97 by a section which does not carry valve means. It will be evident that this arrangement makes for a relatively compact structure, because it is not necessary to provide a separate body section for containing each valve means.

I claim:

In a valve construction adapted for use on producing wells, a body formed of a plurality of stacked plate-like sections each of circular external configuration as viewed in plan, and of substantially the same outside diameter, bolting means for mounting the lower one of said sections on a wellhead and for clamping all of said stacked sections together, said bolting means including bolts distributed about a common bolting circle, said common bolting circle being of lesser diameter than the outside diameter of said sections, a plurality of straight flow passages extending through all of said sections and each formed by aligned openings in individual sections, at least two intermediate sections formed with elongated recesses each extending from top to bottom of the respective sections and slightly wider than and at least twice as long as the diameter of said flow passages and as viewed in plan being spaced from the side edge of said intermediate section, said recesses lying entirely within the projection of said bolting circle as viewed in plan, one said recess communicating with one said passage and another said recess communicating with another said passage, and separate valve control means for each said recess for controlling flow through the respective flow passages, each said flow control valve means including a valve gate having a port dimensioned to form one of said openings when said gate is in open position and operating means for said gate carried by said respective intermediate section, an upper one of said sections having a passage therein which communicates laterally with said flow passage.

References Cited in the file of this patent
UNITED STATES PATENTS

| | | |
|---|---|---|
| 2,651,324 | Hodgson | Sept. 8, 1953 |
| 2,834,368 | Gray | May 13, 1958 |
| 2,854,209 | Erwin | Sept. 30, 1958 |
| 2,859,773 | Wallace | Nov. 11, 1958 |
| 2,885,005 | Rhodes | May 5, 1959 |